United States Patent
Kuramochi

(10) Patent No.: US 8,126,942 B2
(45) Date of Patent: Feb. 28, 2012

(54) DATA PROCESSING SYSTEM AND DATA PROCESSING METHOD

(75) Inventor: Mamiko Kuramochi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 2042 days.

(21) Appl. No.: 09/785,230

(22) Filed: Feb. 20, 2001

(65) Prior Publication Data

US 2002/0026450 A1     Feb. 28, 2002

(30) Foreign Application Priority Data

Aug. 25, 2000  (JP) ................. 2000-256174

(51) Int. Cl.
*G06F 17/30*  (2006.01)
(52) U.S. Cl. ................. 707/821; 707/899; 707/E17.006
(58) Field of Classification Search ............. 707/1, 101, 707/203, 102, 100, 3, 10, 200
See application file for complete search history.

(56) References Cited

U.S. PATENT DOCUMENTS

| | | | | |
|---|---|---|---|---|
| 4,903,229 | A * | 2/1990 | Schmidt et al. | 707/200 |
| 5,960,444 | A * | 9/1999 | Jackson | 707/203 |
| 6,191,807 | B1 * | 2/2001 | Hamada et al. | 348/14.07 |
| 6,484,178 | B1 * | 11/2002 | Bence et al. | 707/101 |
| 6,594,664 | B1 * | 7/2003 | Estrada et al. | 707/10 |

FOREIGN PATENT DOCUMENTS

| | | |
|---|---|---|
| JP | 7-319911 A | 12/1995 |
| JP | 7-336659 A | 12/1995 |
| JP | 07336659 * | 12/1995 |
| JP | 7336659 * | 12/1995 |
| JP | 09-231059 | 9/1997 |
| JP | 9-282209 A | 10/1997 |
| JP | 9282209 * | 10/1997 |
| JP | 09282209 * | 10/1997 |
| JP | 10-307623 A | 11/1998 |

OTHER PUBLICATIONS

Fujitsu Kabushiki Kaisha, "Fujitsu Micro 8 F-Basic Grammar Book 81SM-000010-1," (1981) pp. 72, 73, 805-102, 183-198.

* cited by examiner

*Primary Examiner* — Leslie Wong
(74) *Attorney, Agent, or Firm* — Staas & Halsey LLP

(57) ABSTRACT

A data processing system includes a display control unit of implementing a display module for displaying at least one format file containing a fixed format, and at least one data file containing item data to be set to the fixed format, a specifying control unit of implementing a specifying module for specifying any one of the format file and the data file, and also specifying the other category of file from this one file, and a setting unit of setting the item data of the data file to the fixed format of the format file in accordance with the specifying operation. This architecture makes it possible to easily input the item data to the fixed format by manipulations on the screen.

38 Claims, 9 Drawing Sheets

DATA PROCESSING SYSTEM AND DATA PROCESSING METHOD

BACKGROUND OF THE INVENTION

The present invention relates to a data processing system and a method thereof that are capable of easily inputting necessary item data to a fixed format by manipulations on a screen.

In a data processing system such as a personal computer, an operator, when inputting the necessary item data (which hereinafter might be simply referred to as "data") to a fixed format specified, writes the necessary item data piece by piece in each of fields in the fixed format through a keyboard.

Accordingly, if there often would occur such an operation of "inputting the necessary item data to the fixed format", an operator must input the necessary item data in a specified location each time by using a keyboard many times.

Generally, when inputting the necessary item data to the fixed format, categories of these pieces of data are limited in the great majority of cases.

According to a conventional method of inputting the necessary item data to the fixed format, the operator must input the data piece by piece through the keyboard as the necessity may arise in spite of the fact that the data inputted to the fixed format of a slip etc are confined to several categories.

This is very time-consuming for the input process and laborious to the operator, resulting in an outstanding decline of a data input efficiency. Further, it might be inevitable that an occurrence of input error increases in proportion to a rise in the number of input operations.

SUMMARY OF THE INVENTION

Accordingly, it is a primary object of the present invention to provide a data processing system and a method thereof that are capable of easily inputting necessary item data (item data) to a fixed format by manipulations on a screen.

It is another object of the present invention to provide a data processing system and a method thereof that are capable of restraining an occurrence of error of inputting the necessary item data to the fixed format.

To accomplish the above objects, a first data processing system according to the present invention comprises a display control unit of implementing a display module for displaying at least one format file containing a fixed format, and at least one data file containing item data to be set to the fixed format, a specifying control unit of implementing a specifying module for specifying any one of the format file and the data file, and also specifying the other category of file from this one file, and a setting unit for setting the item data of the data file to the fixed format of the format file in accordance with the specifying operation.

In a second data processing system according to the present invention, when there are provided a plurality of format files or data files, the setting unit sets the item data to the fixed format of the format file, and creates the plurality of files at one time.

In a third data processing system according to the present invention, the setting unit sets the item data of the data file to the fixed format of the format file by a form overlay function in accordance with the specifying operation.

A fourth data processing system according to the present invention may further comprise a distinguishing unit of distinguishing between file formats of the specified format file and data file.

In a fifth data processing system according to the present invention, the distinguishing unit distinguishes between the file formats of the format file and the data file on the basis of any one category of element among extensions, file names and a file selection order.

A sixth data processing system according to the present invention may further comprise a print control unit of implementing a print module for printing contents of the item data of the data file which have been set to the fixed format of the format file in accordance with the specifying operation.

In a seventh data processing system according to the present invention, the specifying control unit implements the specifying module for specifying the format file and the data file by a drag and drop function.

In an eighth data processing system according to the present invention, the setting unit sets the item data of the data file to the fixed format of the format file in accordance with the specifying operation of specifying the format file and the data file that are displayed in the form of display objects.

According to the present invention, it is feasible to easily input the necessary item data to the fixed format and to remarkably reduce an operation time because of enabling the print to be carried out in a state where the file remains closed. Further, the operation is not that every character of the necessary item data is inputted to the fixed format, and it is therefore possible to restrain an input error and to create an accurate material as by one-touch operation.

BRIEF DESCRIPTION OF THE DRAWINGS

The foregoing and other features and advantages of the present invention will become more readily appreciated as the same becomes better understood by reference to the following detailed description when taken into conjunction with the accompanying drawings wherein.

DESCRIPTION OF THE PREFERRED EMBODIMENTS

Next, embodiments of the present invention will hereinafter be described with reference to the accompanying drawings.

First Embodiment

[Architecture of Data Processing System]

Figure 1:
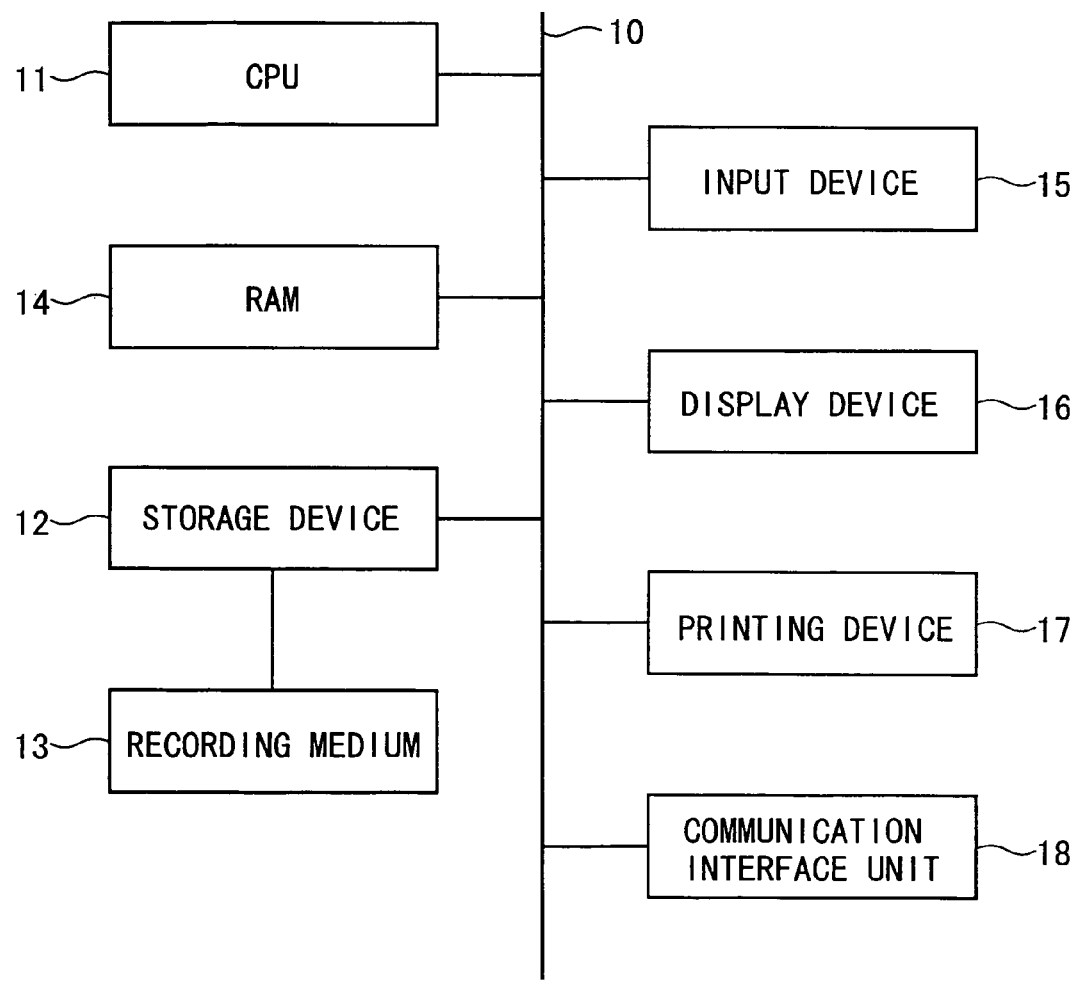
FIG. 1 is a block diagram showing an architecture of a data processing system in a first embodiment of the present invention.
Figure 2:
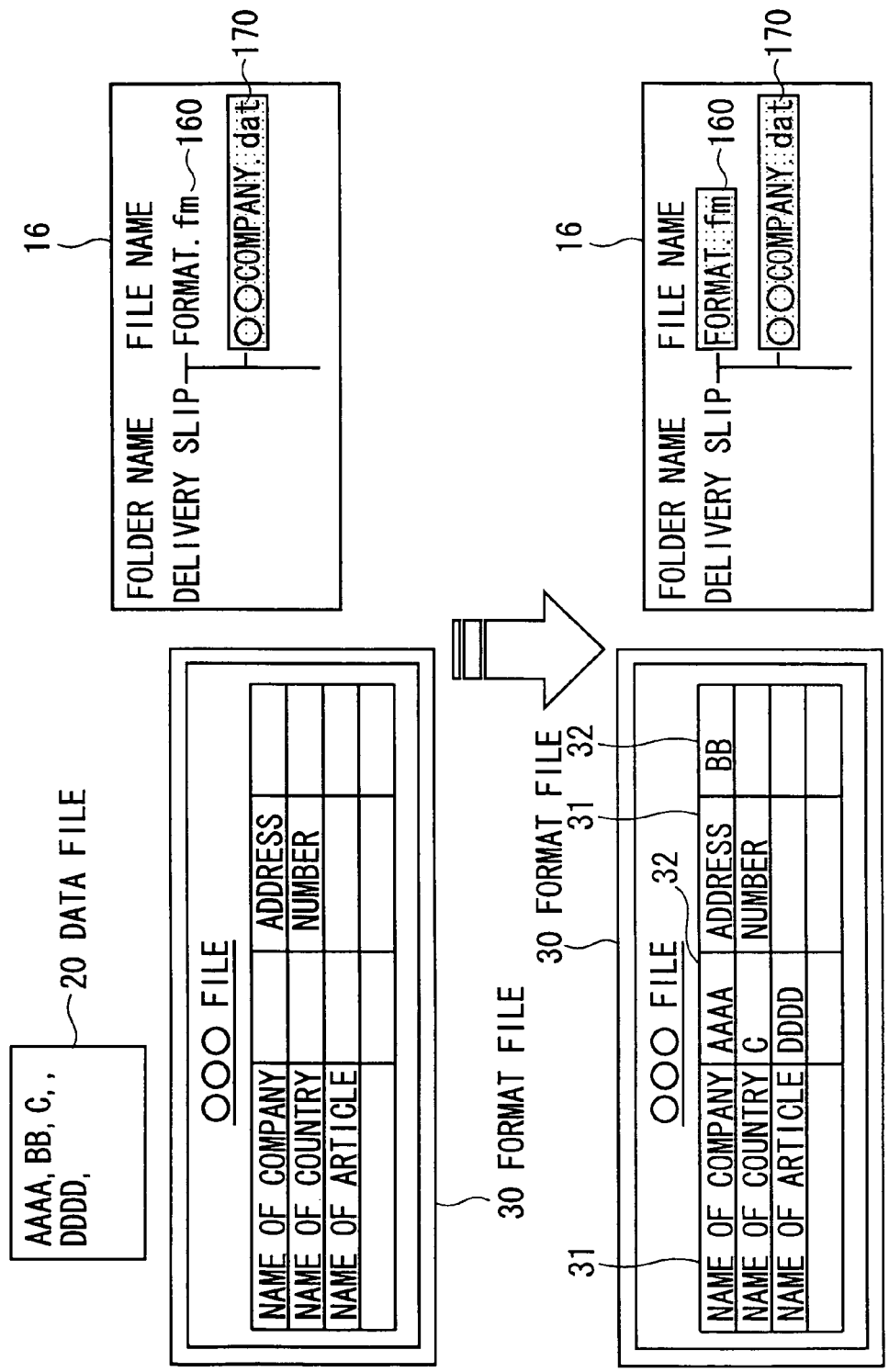
FIG. 2 is an explanatory diagram showing a data input process in the first embodiment.

FIG. 1 is a diagram showing an architecture of a data processing system in a first embodiment of the present invention. Referring to FIG. 1, a data processing system 1 includes, as in the case of a computer terminal unit such as a typical personal computer, a control unit (CPU) 11, a storage device 12 inclusive of a recording medium 13, a main storage device (RAM) 14, an input device 15, a display device 16, a printing device 17 and a communication interface unit 18, which are connected to each other via an internal bus 10.

The CPU 11 reads from the storage device 12 a variety of application programs and a data input processing program that will be explained in depth later on, and executes these programs. The RAM 14 is used as a main storage area for the CPU 11.

The storage device 12 such as a hard disk device includes the recording medium 13 stored previously with the programs executed by the CPU 11 and data as well. The data input processing program is stored on the recording medium 13. This recording medium 13 may be fixedly provided in the recording device 12, or takes such a mode as to be detachably attached thereto.

The input device 15 is constructed of a keyboard and a mouse. The input device 15 is used for inputting a command for executing a specified program. The display device 16 is a display for visibly displaying processing target information or a processed result to an operator as the printing device 17 does.

The communication interface unit 18 is used for connecting the data processing system 1 to an unillustrated communication network, and functions to transmit and receive various items of information to and from other data processing system or a server on the basis of an indication given from the CPU 11.

The data processing system in the first embodiment takes the same architecture also in second and third embodiments that will be discussed later on.

[Operation of Data Processing System]

Next, an example of the data input process by the data processing system 1 in the first embodiment of the present invention will be described referring to FIGS. 1, 2, 3 and 4.

Figure 3:
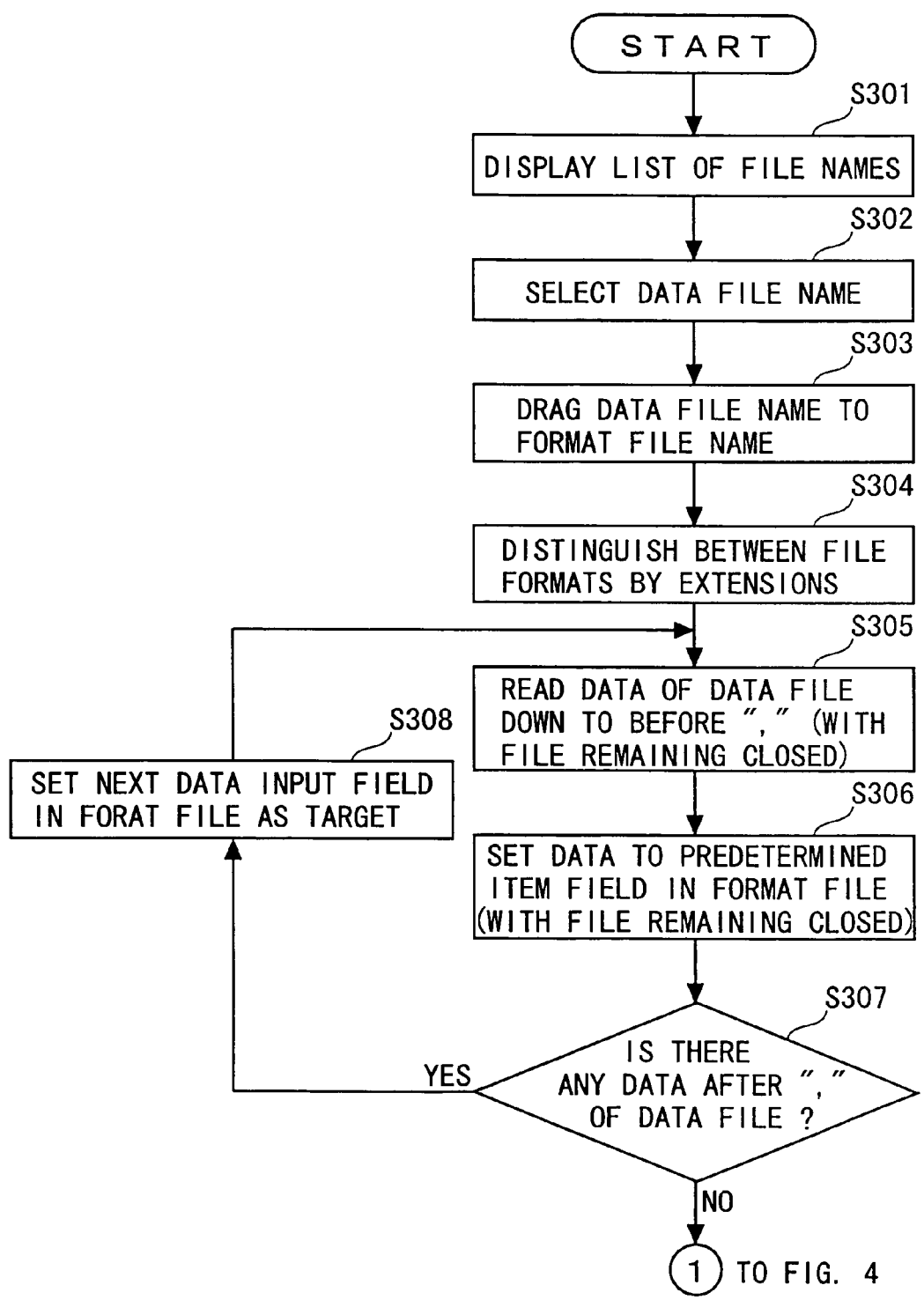
FIG. 3 is a flowchart showing steps of the data input process in the first embodiment.
Figure 4:
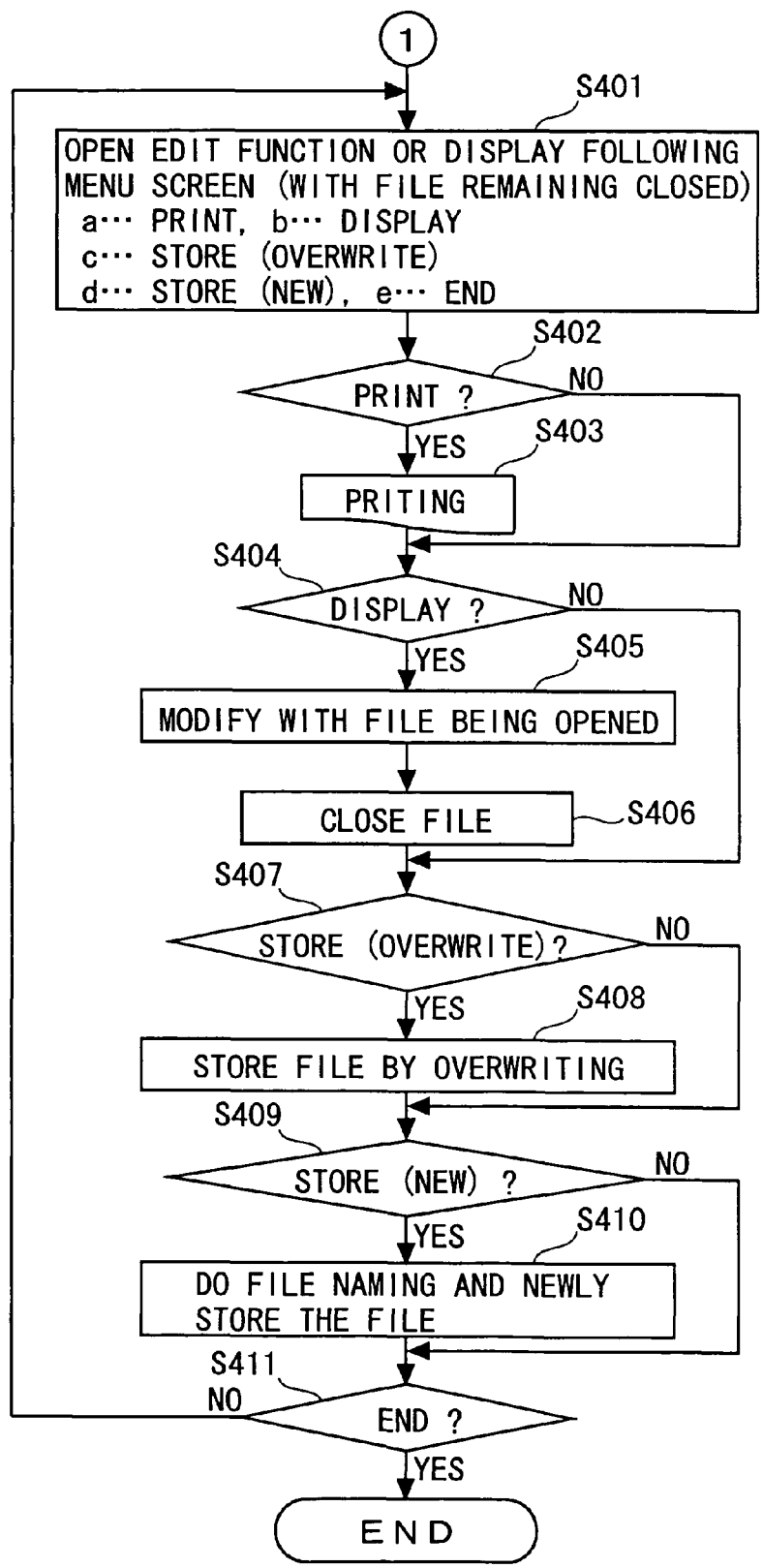
FIG. 4 is a flowchart showing steps of an edit process in the first embodiment.

In the data processing system 1, the CPU 11 reads from the storage device 12 a data input processing program of which processing steps are shown in FIG. 3 and an application program, to be specific, [Explorer] containing an edit process subroutine of which processing steps are shown in FIG. 4, and executes these programs. On the occasion of executing this process, the RAM 14 is used as the main storage area for the CPU 11.

According to the data processing system 1, a hierarchical structure of a folder (folder name: delivery slip) and files (FILE) in the folder are simultaneously displayed on the display device 16. In this state, to start with, a format file name 160 or a data file name 170 is selected by use of the input device 15, and the file is specified by an edit function and a drag & drop function using the mouse without causing the operator to open any file, whereby the data can be inputted.

Further, a format file 30 is closed after inputting the data, in which state the printing device 17 becomes capable of printing. Note that the folder hierarchical structure contains one format file name 160 and a plurality of data file names 170 in this example.

To describe it in greater details, the CPU 11 displays, on the display device 16, a list of the file names in the folder stored inside the data processing system, and makes the operator select the data file name 170 of the file stored with necessary item data (steps S301 and S302 in FIG. 3).

The operator drags, on a screen of the display device 16, the data file name 170 selected by mouse clicking to a display position of the format file name 160 of the file stored with a fixed format (S303).

A data file name [○○ Company.dat] 170 and a format file name [FORMAT.fm] 160 are thereby inputted to the CPU 11. At this time, the CPU 11 is required to distinguish between file formats (file categories) of these inputted file names 160, 170. In this example, the CPU 11 distinguishes between the file formats based on extensions of the files. Namely, it can be judged that an extension [fm] indicates the format file 30, and an extension [dat] indicates the data file 20 (S304).

Note that the CPU 11 may take a file format distinguishing method based on characters (e.g., [F△△] and [D□□] added) of the file name, or a file format distinguishing method based on a file selection order (e.g., the file selected first is conceived as the format file).

Next, the CPU 11 goes on reading the necessary item data in the data file 20 down to before a delimiter [,] (S305). Then, the CPU 11 sets read-out data [AAAA] in a data input field 32 corresponding to a predetermined item field 31 (in which a first item is [name of company]) in the format file 30 (S306).

The CPU 11 checks whether or not data exist after the delimiter [,] in the data file 20 (S307). If any data do not exist, the CPU 11 moves to the edit process which will hereinafter be explained referring to FIG. 4. If the data exist, the CPU 11 sets a next data input field 32 corresponding to an item [address] as a processing target in the format file 30 (S308).

The processes in steps S305 through S308 are repeatedly executed till the data disappear in the data file 20, whereby corresponding pieces of data are set in respective rows of the data input field 31 in the format file 30. Note that data corresponding to an item [number] in the item field 31 in the format file 30 does not exist in the data file 20 in this example.

With this processing, in a state where both of the data file 20 and the format file 30 are closed, the CPU 11 for executing the data input processing program automatically inputs the necessary items of data to a fixed format.

After executing the data input process described above, the edit process such as printing, displaying or storing can be executed by the edit function involving only the selection of the format file name 160, or by manipulations in the menu screen. FIG. 4 shows steps S401 through S411 in this edit process. Herein, the print after the data input process can be effected in the state where the format file 30 is closed.

What was adopted as a data file in the data input process described above is the data file 20 in the format where the comma is used as the delimiter of the data, and pieces of data are enumerated. When the data file 20 in this format is selected and then dragged to the format file 30, pieces of data in the data file 20 are automatically inputted to the data input filed 32 in sequence from the head.

Figure 5:
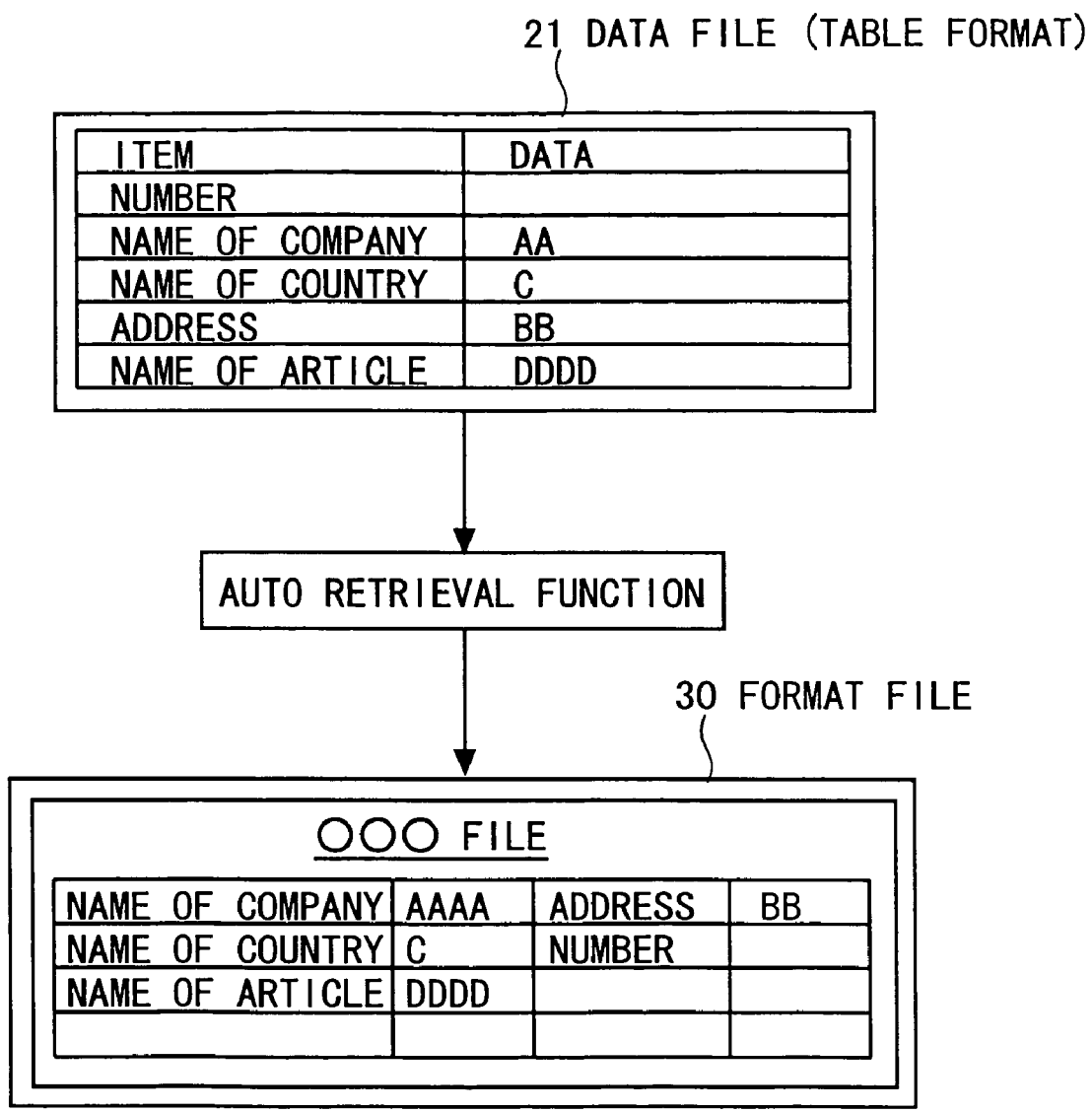
FIG. 5 is a diagram showing one example of a data file in a table format.
Figure 6:
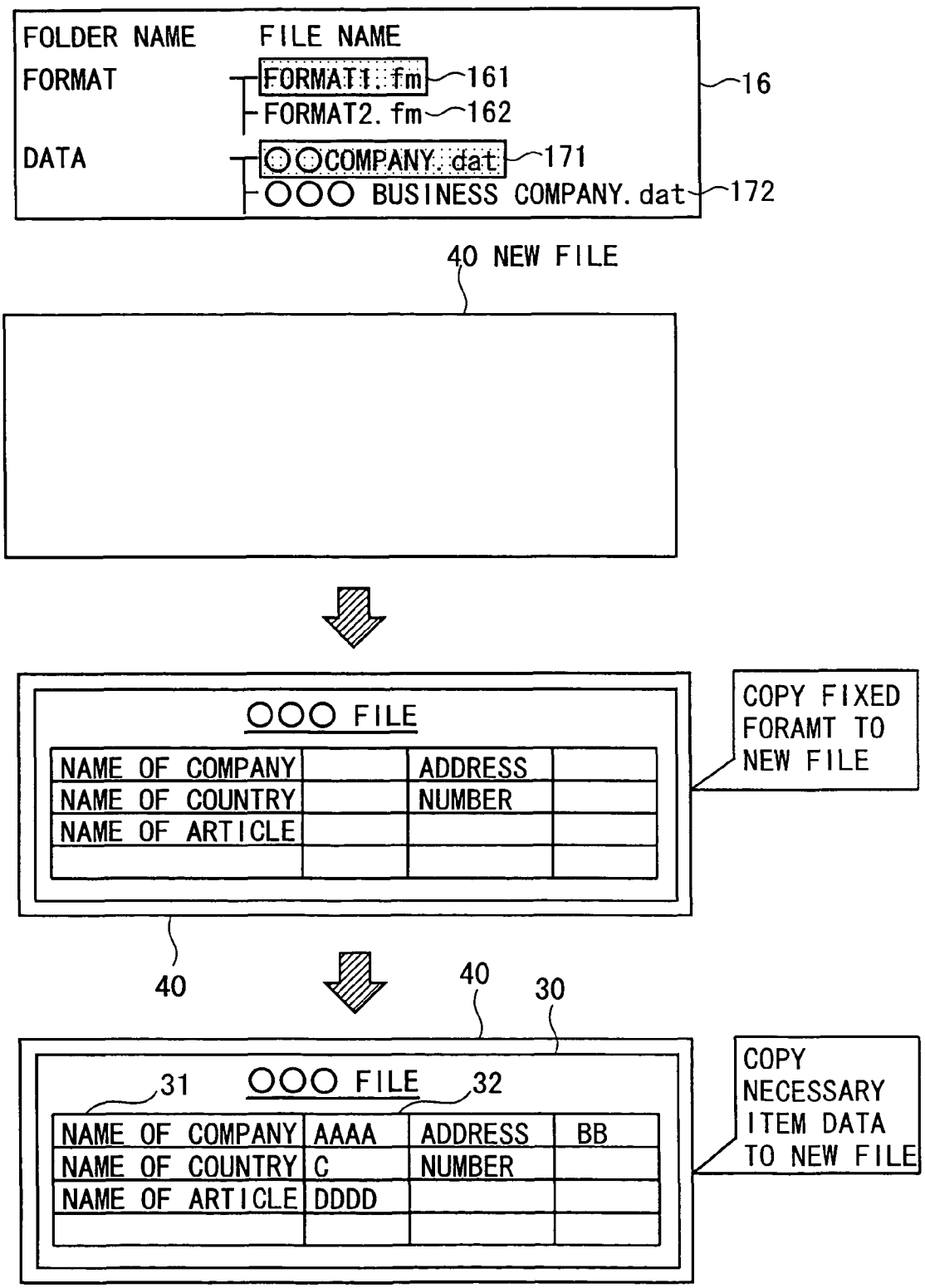
FIG. 6 is an explanatory diagram showing a data input process in a second embodiment.

A data file 21 in which the data are, as shown in FIG. 5, arranged corresponding to respective items in a table format, may also be adopted as a substitute for the data file 20 in this format. In this case, when the data file 21 is selected and dragged to the format file 30, only necessary items of data for the formal file 30 are copied to the format file 30 from the data file 21 by an auto retrieval function.

Second Embodiment

[Operation of Data Processing System]

Next, an example of the data input process by the data processing system 1 in a second embodiment of the present invention will be described referring to FIGS. 1, 4, 6 and 7.

Figure 7:
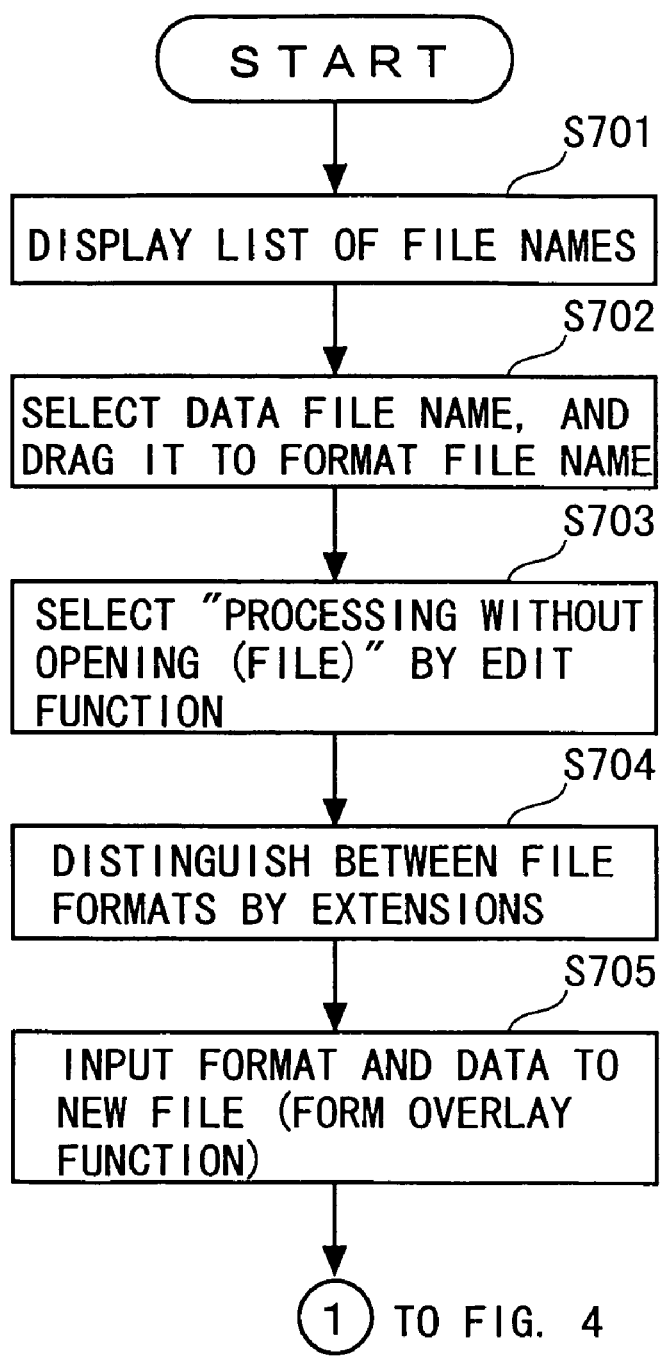
FIG. 7 is a flowchart showing steps of the data input process in the second embodiment.

In the data processing system 1, the CPU 11 reads from the storage device 12 a data input processing program of which processing steps are shown in FIG. 7 and the application program, to be specific, [Explorer] containing the edit process subroutine of which the processing steps are shown in FIG. 4, and executes these programs. On the occasion of executing this process, the RAM 14 is used as the main storage area for the CPU 11.

According to the data processing system 1, the hierarchical structure of the folders (folder names: format and data) and files in the folders are simultaneously displayed on the display device 16. In this state, at first, a format file name 161 or a data file name 171 is selected by use of the input device 15, and, with these files remaining closed, it is feasible to create a new file 40 in which necessary items of data are inputted to the fixed format by the drag & drop function and a form overlay function.

Further, the printing device 17 becomes capable of printing in the state where the new file, i.e., the format file 40 is closed after inputting the data. Note that the folder hierarchical structure contains the plurality of format file names 161, 162 and the plurality of data file names 171, 172 in this example.

To give a more detailed description, the CPU 11 displays on the display device 16 a list of the file names of the folder stored within the data processing system, and the operator selects the data filename 171 of the file stored with the necessary item data on the screen of the display device 16, and drags the selected data file name 171 to a display position of the format file name 161 of the file stored with the fixed format (steps S701 and S702 in FIG. 7).

Further, without opening those files, the operator selects [do processing without opening the file] (S703). As a result, the CPU 11 opens a new file 40 on the RAM 14.

A data file name [∘∘ Company.dat] 171 and a format file name [FORMAT1.fm] 161 are thereby inputted to the CPU 11. At this time, the CPU 11 is required to distinguish between file formats of these inputted file names 161, 171.

In this example, the CPU 11 distinguishes between the file formats based on extensions of the files. Namely, it can be judged that the extension [fm] indicates the format file, and the extension [dat] indicates the data file (S704). Note that the CPU 11 may take the file format distinguishing method based on characters of the filename, or the file format distinguishing method based on the file selection order.

Next, the CPU 11 copies, to the new file 40, the fixed format stored in the format file corresponding to the format file name 161 by the form overlay function. Further, the CPU 11 copies to the new file 40 the necessary item data stored in the data file corresponding to the data file name 171 by the form overlay function. At this time, the CPU 11 sets pieces of data in the rows of the data input filed 32 that correspond to the predetermined items in the item field 31 in the format file 30 (S705).

With this processing, in a state where both of the data file and the format file are closed, the CPU 11 for executing the data input processing program automatically inputs the necessary items of data to the fixed format.

After executing the data input process described above, the edit process (see FIG. 4) such as printing, displaying or storing can be executed by the edit function involving only the selection of the format file name 161, or by manipulations on the menu screen.

In the data input process described above, as shown in FIG. 2, there may be adopted the data file 20 taking such a format that pieces of data are enumerated, or, as shown in FIG. 5, the data file 21 in which pieces of data are arranged corresponding to the respective items in the table format.

Third Embodiment

[Operation of Data Processing System]

Next, an example of the data input process by the data processing system 1 in a third embodiment of the present invention will be described referring to FIGS. 1, 4, 8 and 9.

In the data processing system 1, the CPU 11 reads from the storage device 12 a data input processing program of which processing steps are shown in FIG. 97 and the application program, to be specific, [Explorer] containing the edit process subroutine of which the processing steps are shown in FIG. 4, and executes these programs. On the occasion of executing this process, the RAM 14 is used as the main storage area for the CPU 11.

According to the data processing system 1, the hierarchical structure of the folders (folder names: format and data) and files in the folders are simultaneously displayed on the display device 16. In this state, to begin with, at least one of format file names 161, 162, or at least of one of data file names 171, 172 is selected by use of the input device 15, and, with these files remaining closed, it is possible to create a plurality of files at one time by inputting the necessary items of data to the fixed format by the drag & drop function and the form overlay function.

Further, the printing device 17 becomes capable of printing in the state where the format file 30 or the new file 40 is closed after inputting the data. Note that the folder hierarchical structure contains the plurality of format file names 161, 162 and the plurality of data file names 171, 172 in this example.

Figure 9:
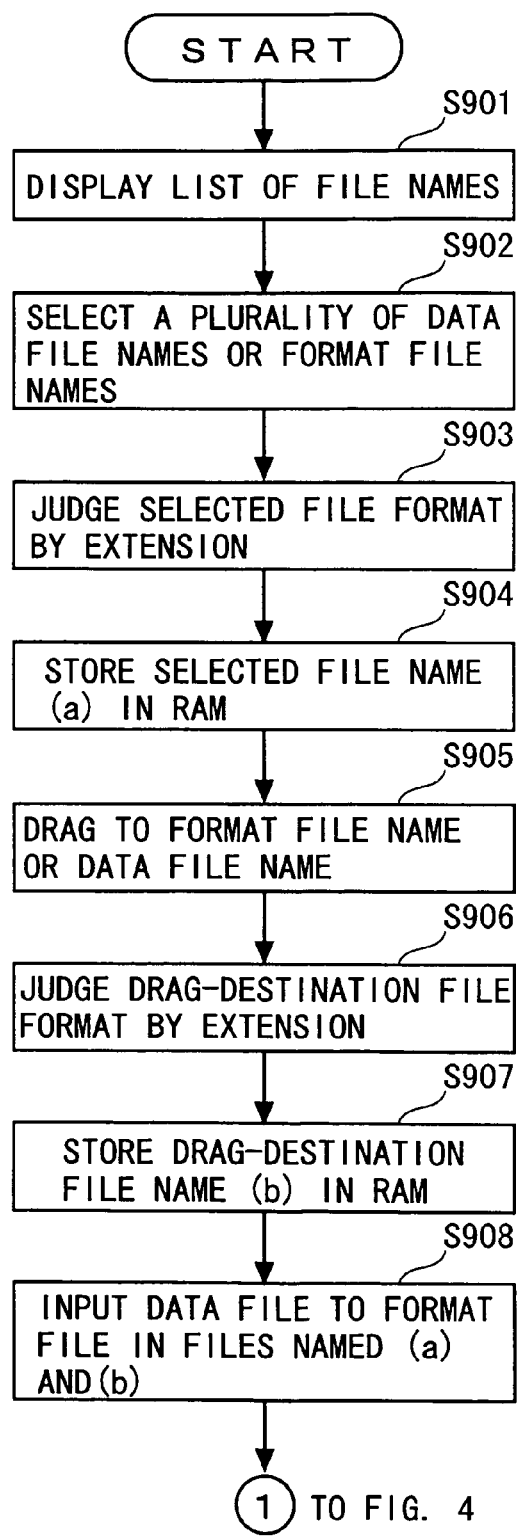
FIG. 9 is a flowchart showing steps of the data input process in the third embodiment.

To describe it in depth, the CPU 11 displays on the display device 16 the list of the file names of the folder stored within the data processing system, and the operator selects the data file names 171, 172 of the files stored with the necessary items of data, or the format file names 161, 162 of the files each stored with the fixed format (steps S901, S902 in FIG. 9).

Figure 8A:
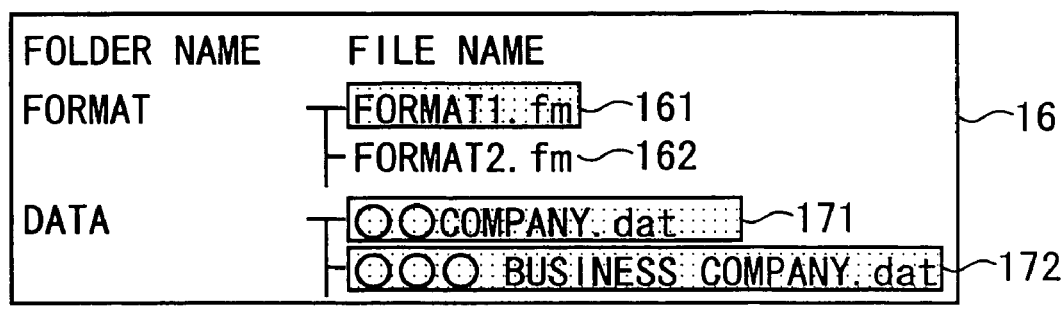
FIG. 8 is an explanatory diagram showing a data input process in a third embodiment.
Figure 8B:
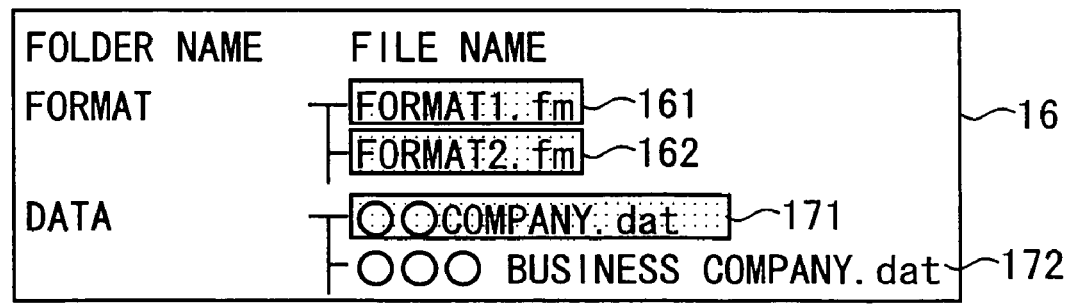

At this time, the operator selects display positions of the data file names 171, 172 or the format file names 161, 162 on the screen of the display device 16. FIG. 8(A) shows a case where the plurality of data file names 171, 172 are selected. FIG. 8(B) shows a case in which the plurality of format file names 161, 162 are selected.

The data file name [∘∘ Company.dat] 171 and the data file name [∘∘ Business Company.dat] 172 or the format file names [FORMAT1.fm] 161 and the format file name [FORMAT2.fm] 162 are thereby inputted to the CPU 11.

At this time, the CPU 11 is required to distinguish between the file formats of these inputted file names 171, 172 or file names 161, 162. In this example, the CPU 11 distinguishes between the file formats based on extensions of the files. Namely, it can be judged that the extension [fm] indicates the format file, and the extension [dat] indicates the data file (S903).

Note that the CPU 11 may take the file format distinguishing method based on characters of the file name, or the file format distinguishing method based on the file selection order. Further, the CPU 11 stores the RAM 14 with those inputted file names 171, 172 or file names 161, 162 (S904).

Next, the operator drags the data file names 171, 172 or the format file names 161, 162 selected by the process in S902, to one of the other file names (S905).

The CPU 11 judges, based on the extension, the file format of the file name to which the selected file names have been dragged (S906). Further, the CPU 11 stores the RAM 14 with the file name to which those selected file names have been dragged (S907).

Next, if the plurality of data file names 171, 172 are selected and dragged to the format file name 161, the CPU 11 sets respective pieces of data of the plurality of data files in the rows of the data input field 32, which corresponds to the predetermined items in the item field 31 in one format file 30 by the form overlay function described above, thereby creating a plurality of files at one time (S908).

Further, if the plurality of format file names 161, 162 are selected and dragged to the data file name 171, the CPU 11 sets respective pieces of data of one data file in the rows of the data input field 32, which corresponds to the predetermined items in the respective item fields 31 in the plurality of format files 30 by the form overlay function described above, thereby creating a plurality of files at one time (S908).

With this processing, in a state where both the data file and the format file are closed, the CPU 11 for executing the data input processing program automatically inputs the necessary items of data to the fixed format.

After executing the data input process described above, the edit process (see FIG. 4) such as printing, displaying or storing can be executed by the edit function involving only the selection of the format file name, or by manipulations on the menu screen. Herein, the printing after the data input process can be carried out in the state where the format file 30 or the newly created file 40 is closed.

In the data input process described above, as shown in FIG. 2, there may be adopted the data file 20 taking such a format that pieces of data are enumerated, or, as shown in FIG. 5, the data file 21 in which pieces of data are arranged corresponding to the respective items in the table format.

MODIFIED EXAMPLE

In each of the embodiments discussed above, the format file and the data file may be displayed as display objects (icons).

Further, the processes in the respective embodiments discussed above can be actualized as a program executable by a computer, and the program can be recorded on a recording medium such as a CD-ROM and a floppy disk and further distributed via a communication line.

According to the present invention embracing the embodiments discussed above, the term [specifying] includes [selecting] and [dragging].

Although only a few embodiments of the present invention have been described in detail above, those skilled in the art will readily appreciate that many modifications are possible in the preferred embodiments without departing from the novel teachings and advantages of this invention. Accordingly, all such modifications are intended to be included within the scope of the present invention as defined by the following claims.

What is claimed is:

1. The data processing system comprising:
a display control unit implementing a display module displaying at least one format file containing a fixed format, and at least one data file containing item data to be set to the fixed format;
a specifying control unit implementing a specifying module which performs two different operations, a first operation in which the specifying module firstly selects the data file and secondly drags the selected data file to the format file, and a second operation in which the specifying module firstly selects the format file and secondly drags the selected format file to the data file; and
a setting unit setting the item data of the data file to the fixed format of the format file in accordance with the specifying operation.

2. The data processing system according to claim 1, wherein when there are provided a plurality of format files or data files, said setting unit sets the item data to the fixed format of the format file, and creates the plurality of files at one time.

3. The data processing system according to claim 1, wherein said setting unit sets the item data of the data file to the fixed format of the format file by a form overlay function in accordance with the specifying operation.

4. The data processing system according to claim 1, further comprising a distinguishing unit distinguishing between file formats of the specified format file and data file.

5. The data processing system according to claim 4, wherein said distinguishing unit distinguishes between the file formats of the format file and the data file on the basis of any one category of element among extensions, file names and a file selection order.

6. The data processing system according to claim 1, further comprising a print control unit of implementing a print module for printing contents of the item data of the data file which have been set to the fixed format of the format file in accordance with the specifying operation.

7. The data processing system according to claim 1, wherein said specifying control unit implements the specifying module for specifying the format file and the data file by a drag and drop function.

8. The data processing system according to claim 1, wherein said setting unit sets the item data of the data file to the fixed format of the format file in accordance with the specifying operation of specifying the format file and the data file that are displayed in the form of display objects.

9. A data processing method comprising:
implementing a display module to display at least one format file containing a fixed format, and at least one data file containing item data to be set to the fixed format;
implementing a specifying module which performs two different operations, a first operation in which the specifying module firstly selects the data file and secondly drags the selected data file to the format file, and a second operation in which the specifying module firstly selects the format file and secondly drags the selected format file to the data file; and
setting the item data of the data file to the fixed format of the format file in accordance with the specifying operation.

10. The data processing method according to claim 9, further comprising setting, when there are provided a plurality of format files or data files, the item data to the fixed format of the format file, and creating the plurality of files at one time.

11. The data processing method according to claim 9, further comprising setting the item data of the data file to the fixed format of the format file by a form overlay function in accordance with the specifying operation.

12. The data processing method according to claim 9, further comprising distinguishing between file formats of the specified format file and data file.

13. The data processing method according to claim 9, further comprising implementing a print module for printing contents of the item data of the data file which have been set to the fixed format of the format file in accordance with the specifying operation.

14. The data processing method according to claim 9, further comprising implementing the specifying module for specifying the format file and the data file by a drag and drop function.

15. The data processing method according to claim 9, further comprising setting the item data of the data file to the fixed format of the format file in accordance with the specifying operation of specifying the format file and the data file that are displayed in the form of display objects.

16. A readable-by-computer medium recorded with a program comprising:

implementing a display module for displaying at least one format file containing a fixed format, and at least one data file containing item data to be set to the fixed format;

implementing a specifying module which performs two different operations, a first operation in which the specifying module firstly selects the data file and secondly drags the selected data file to the format file, and a second operation in which the specifying module firstly selects the format file and secondly drags the selected format file to the data file; and setting the item data of the data file to the fixed format of the format file in accordance with the specifying operation.

17. The readable-by-computer medium recorded with a program according to claim 16, further comprising setting, when there are provided a plurality of format files or data files, the item data to the fixed format of the format file, and creating the plurality of files at one time.

18. The readable-by-computer medium recorded with a program according to claim 16, further comprising setting the item data of the data file to the fixed format of the format file by a form overlay function in accordance with the specifying operation.

19. The readable-by-computer medium recorded with a program according to claim 16, further comprising distinguishing between file formats of the specified format file and data file.

20. The readable-by-computer medium recorded with a program according to claim 16, further comprising implementing a print module for printing contents of the item data of the data file which have been set to the fixed format of the format file in accordance with the specifying operation.

21. The readable-by-computer medium recorded with a program according to claim 16, further comprising implementing the specifying module for specifying the format file and the data file by a drag and drop function.

22. The readable-by-computer medium recorded with a program according to claim 16, further comprising setting the item data of the data file to the fixed format of the format file in accordance with the specifying operation of specifying the format file and the data file that are displayed in the form of display objects.

23. The data processing system as in claim 1, wherein the format file and the data file are displayed as a list.

24. The data processing system according to claim 2, wherein said setting unit sets the item data of the data file to the fixed format of the format file by a form overlay function in accordance with the specifying operation.

25. The data processing system according to claim 2, further comprising a distinguishing unit distinguishing between file formats of the specified format file and data file.

26. The data processing system according to claim 2, further comprising a print control unit implementing a print module printing contents of the item data of the data file which have been set to the fixed format of the format file in accordance with the specifying operation.

27. The data processing system according to claim 2, wherein said specifying control unit implements the specifying module for specifying the format file and the data file by a drag and drop function.

28. The data processing system according to claim 2, wherein said setting unit sets the item data of the data file to the fixed format of the format file in accordance with the specifying operation of specifying the format file and the data file that are displayed in the form of display objects.

29. The data processing method according to claim 10, further comprising setting the item data of the data file to the fixed format of the format file by a form overlay function in accordance with the specifying operation.

30. The data processing method according to claim 10, further comprising distinguishing between file formats of the specified format file and data file.

31. The data processing method according to claim 10, further comprising implementing a print module printing contents of the item data of the data file which have been set to the fixed format of the format file in accordance with the specifying operation.

32. The data processing method according to claim 10, further comprising implementing the specifying module for specifying the format file and the data file by a drag and drop function.

33. The data processing method according to claim 10, further comprising setting the item data of the data file to the fixed format of the format file in accordance with the specifying operation of specifying the format file and the data file that are displayed in the form of display objects.

34. The readable-by-computer medium recorded with a program according to claim 17, further comprising setting the item data of the data file to the fixed format of the format file by a form overlay function in accordance with the specifying operation.

35. The readable-by-computer medium recorded with a program according to claim 17, further comprising distinguishing between file formats of the specified format file and data file.

36. The readable-by-computer medium recorded with a program according to claim 17, further comprising implementing a print module for printing contents of the item data of the data file which have been set to the fixed format of the format file in accordance with the specifying operation.

37. The readable-by-computer medium recorded with a program according to claim 17, further comprising implementing the specifying module for specifying the format file and the data file by a drag and drop function.

38. The readable-by-computer medium recorded with a program according to claim 17, further comprising setting the item data of the data file to the fixed format of the format file in accordance with the specifying operation of specifying the format file and the data file that are displayed in the form of display objects.

* * * * *

UNITED STATES PATENT AND TRADEMARK OFFICE
CERTIFICATE OF CORRECTION

| | | |
|---|---|---|
| PATENT NO. | : 8,126,942 B2 | Page 1 of 1 |
| APPLICATION NO. | : 09/785230 | |
| DATED | : February 28, 2012 | |
| INVENTOR(S) | : Mamiko Kuramochi | |

It is certified that error appears in the above-identified patent and that said Letters Patent is hereby corrected as shown below:

Column 7, Line 58, In Claim 1, delete "The" and insert -- A --, therefor.

Signed and Sealed this
Twenty-second Day of May, 2012

David J. Kappos
*Director of the United States Patent and Trademark Office*